(12) United States Patent
Pastorina et al.

(10) Patent No.: US 10,536,095 B1
(45) Date of Patent: Jan. 14, 2020

(54) RESONANT CONVERTER WITH NEGATIVE CURRENT FEEDBACK

(71) Applicant: Maxim Integrated Products, Inc., San Jose, CA (US)

(72) Inventors: Salvatore G. Pastorina, Catania (IT); Tonio G. Biondi, Catania (IT)

(73) Assignee: Maxim Integrated Product, Inc., San Jose, CA (US)

( * ) Notice: Subject to any disclaimer, the term of this patent is extended or adjusted under 35 U.S.C. 154(b) by 0 days.

(21) Appl. No.: 15/959,146

(22) Filed: Apr. 20, 2018

Related U.S. Application Data

(60) Provisional application No. 62/487,916, filed on Apr. 20, 2017.

(51) Int. Cl.
*H02M 7/538* (2007.01)
*H02M 7/04* (2006.01)
*H02M 7/48* (2007.01)

(52) U.S. Cl.
CPC ....... *H02M 7/53803* (2013.01); *H02M 7/043* (2013.01); *H02M 2007/4815* (2013.01)

(58) Field of Classification Search
CPC ................................................ H02M 7/53803
See application file for complete search history.

(56) References Cited

U.S. PATENT DOCUMENTS

| 9,584,044 | B2 | 2/2017 | Zhou et al. | |
|---|---|---|---|---|
| 2012/0319669 | A1* | 12/2012 | Chen | H02M 3/1582 323/283 |
| 2015/0357922 | A1* | 12/2015 | Lai | H02M 3/33592 363/21.02 |
| 2016/0149501 | A1* | 5/2016 | Dai | H02M 3/337 363/21.02 |

FOREIGN PATENT DOCUMENTS

GB  2468490 A  9/2010

* cited by examiner

*Primary Examiner* — Jue Zhang
*Assistant Examiner* — Trinh Q Dang
(74) *Attorney, Agent, or Firm* — TIPS Group

(57) ABSTRACT

A programmable, high efficiency resonant converter includes a resonant cell including a first capacitor and a first inductor, the resonant cell having a voltage output VOUT coupled to the first capacitor with a first switch and a first feedback input coupled to the first inductor; and a hard switching cell including a second capacitor and a second inductor, the hard switching cell having a second feedback input coupled to the second capacitor and a voltage output VX coupled to the second capacitor and to the first feedback input of the resonant cell, whereby a negative current is applied to the resonant cell.

20 Claims, 6 Drawing Sheets

VL = L*VIN
VOUT=VIN* (1-L)/K

VOUT=VIN / [2*(n+m*K+1)]
IOUT = Ix * [2*(n+m*K+1)]
IRES = Ix * 2(n+1)
IBOOST = Ix * m*K

RESONANT CONVERTER WITH NEGATIVE CURRENT FEEDBACK

CROSS REFERENCE TO RELATED APPLICATIONS

This application claims the benefit of U.S. Ser. No. 62/487,916, filed Apr. 20, 2017, incorporated herein by reference.

BACKGROUND

A switching-mode power supply (SMPS) is an electronic power supply that incorporates a switching regulator to convert electrical power efficiently. Like other power supplies, it transfers power from a source to a load while converting voltage and current characteristics. Unlike a linear power supply, the pass elements of a SMPS continually switch between low-dissipation on and off states. Depending on the amount of current flowing in the switching elements during commutations SMPSs can be classified as Hard-Switching and Zero-Current-Switching.

In a Hard-Switching (HSW) topology switches are turned on/off while the converter is still delivering current to the output, this means that they spend some time in high-dissipation transition states. Since this time is usually small (10 ns range), efficiency loss is acceptable as far as input voltage, for a given load, is low (12V-16V).

The picture changes when dealing with high input voltages (40V-60V) since losses due to hard switching have a relevant impact on efficiency. For this reason Zero-Current-Switching (ZCS) configurations have been proposed in order to minimize power losses during transitions. These converters are usually based on resonant LC cells where the switching events needed to redirect energy from input to output are synchronized with LC oscillations.

From above description it is evident that while in a HSW converter switching events (duty cycle) can be freely controlled to get a desired Input-Output ratio, in a ZCS converter this is no longer possible since switching events are constrained by the resonance. For these architectures conversion ratio is usually defined by means of external components and cannot be changed.

These and other limitations of the prior art will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, but not to limit, the invention. The drawings include the following figures.

DETAILED DESCRIPTION OF EXAMPLE EMBODIMENTS

An example resonant converter combines resonant and hard switching circuits such that the output voltage is programmable over a wide range of values and with improved efficiency. Other advantages of certain example embodiments include improved line and load regulation, improved transient response, simplified start-up sequence and current protection protocols.

Figure 1:
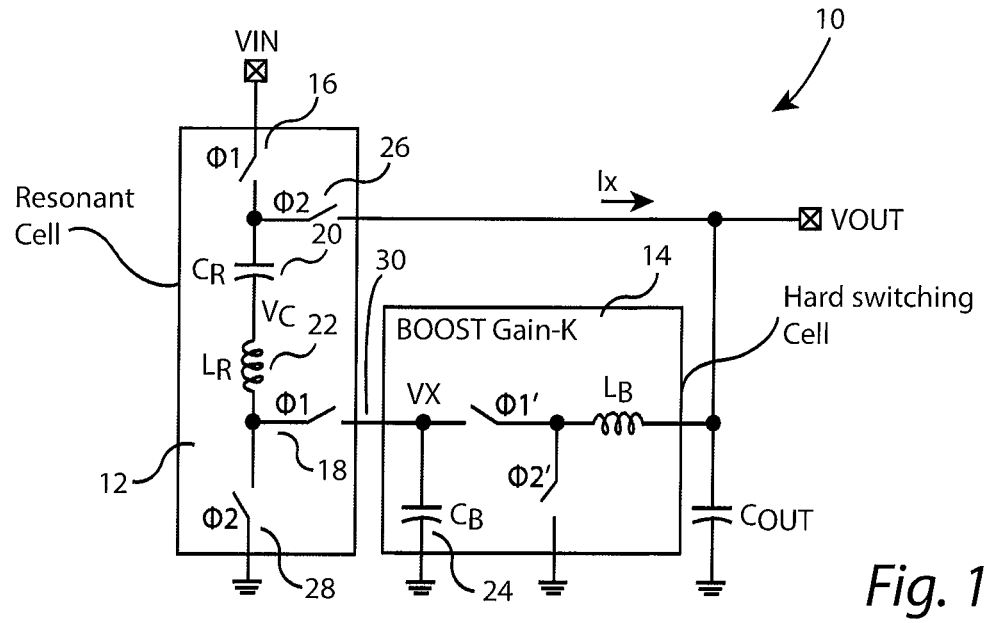
FIG. 1 is a schematic block diagram of an example transformerless resonant converter.

FIG. 1 is a schematic block diagram of an example transformerless resonant converter 10 including a resonant circuit ("cell") 12 and a hard switching cell 14 configured as a Boost converter with a gain K. In order to explain operation of the converter 10, first consider the resonance cell 12. During phase f1 switches 16 and 18 are closed and a voltage equal to Vin-VX is applied to an LC resonator including capacitor 20 and inductor 22. Node Vc swings around Vx so average voltage across resonant capacitor 20 is VIN-VX. Current through inductor 22 flows from VIN to node VX and charges a bulk capacitor 24 of hard switching cell 14 that stores part of the energy of the resonance cell 12. During phase f2 the resonant cell 12 is connected between VOUT and ground by closing switches 26 and 28. Node VC now swings around ground thus average voltage across capacitor 20 is VOUT. Inductor 22 current flows from ground to the output VOUT and energy is delivered to the output. Energy transfer to both VX and VOUT is accomplished with efficiency hR. The average voltage across capacitor 20 from f1 to f2 can be represented by the following equation:

$$VOUT = VIN - VX \tag{1}$$

In this example, the hard switching cell 14 is a Boost converter of gain K where input is VOUT and output is VX. Duty cycle is controlled in order to obtain:

$$VX = k*VOUT \tag{2}$$

In steady state, since the resonant cell 12 charges capacitor 24, the hard switching cell 14 operates with negative current: cycle by cycle the energy stored in capacitor 24 is delivered to VOUT. This energy transfer is accomplished with efficiency hB. It will therefore be appreciated that the boosted voltage VX is fed back to a first feedback input 30 of resonant cell 12 providing a negative current to the resonant cell.

Operation of the resonant converter 10 is as follows. Voltage transfer function is obtained by combining equations (1) and (2) to get VIN-k*VOUT=VOUT and thus:

$$VOUT = VIN/(k+1) \tag{3}$$

From Equation (3) it is evident that output voltage can be set to any desired value by controlling hard switching cell duty cycle.

Current Ix delivered to the output by the resonant cell 12 can be easily derived if we consider that the same current is injected into node Vx. The hard switching cell 14 has to remove charge from Vx so its output current will be Ix/D, where D is the hard switching cell 14 duty cycle. We have Ix+Ix/D=IOUT and thus:

$$Ix = IOUT*D/(1+D) \quad (4)$$

From equation (4) it is clear that most of the output current is provided from the hard switching cell 14 cell and this limits the overall efficiency since the lower the desired VOUT the higher the VX.

Figure 2:
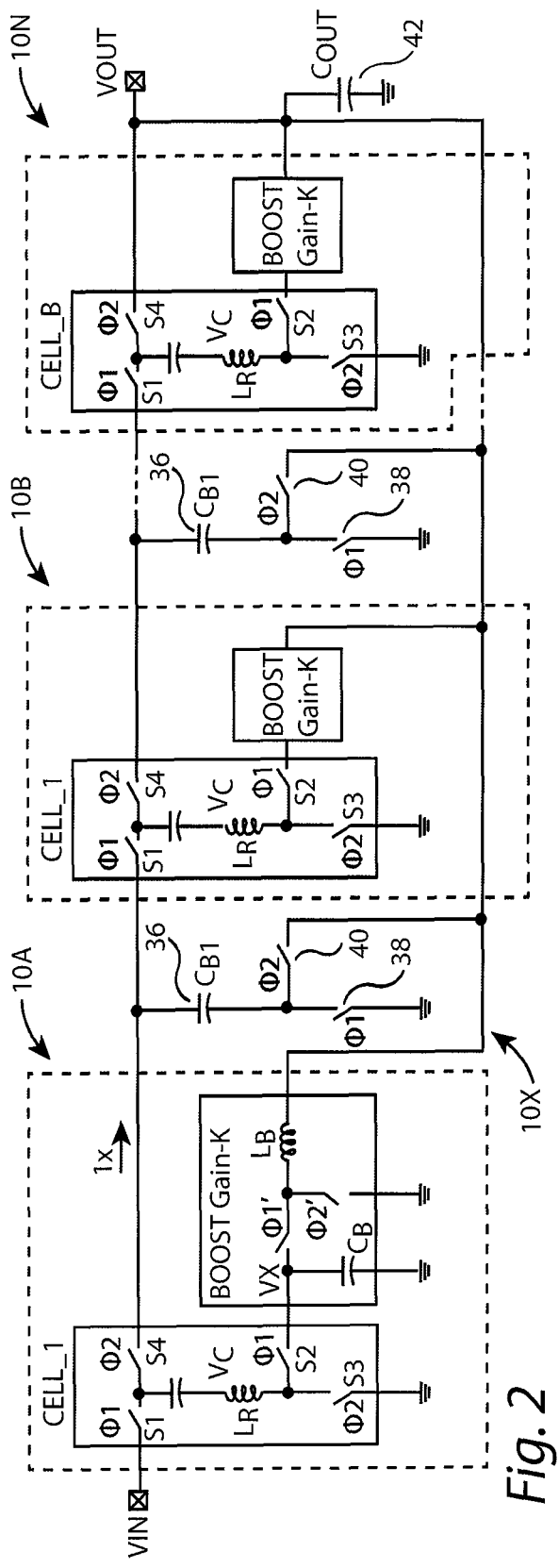
FIG. 2 is a schematic block diagram of an example N-stage transformerless resonant converter.

FIG. 2 is a schematic block diagram of an example N-stage transformerless resonant converter 10X including stages 10A, 10B ... 10N. In this non-limiting example, the number of stages can be 6. Coupled between adjacent stages are capacitors 36 and switches 38 and 40. A smoothing capacitor 42 is coupled to the output VOUT.

Figure 3:
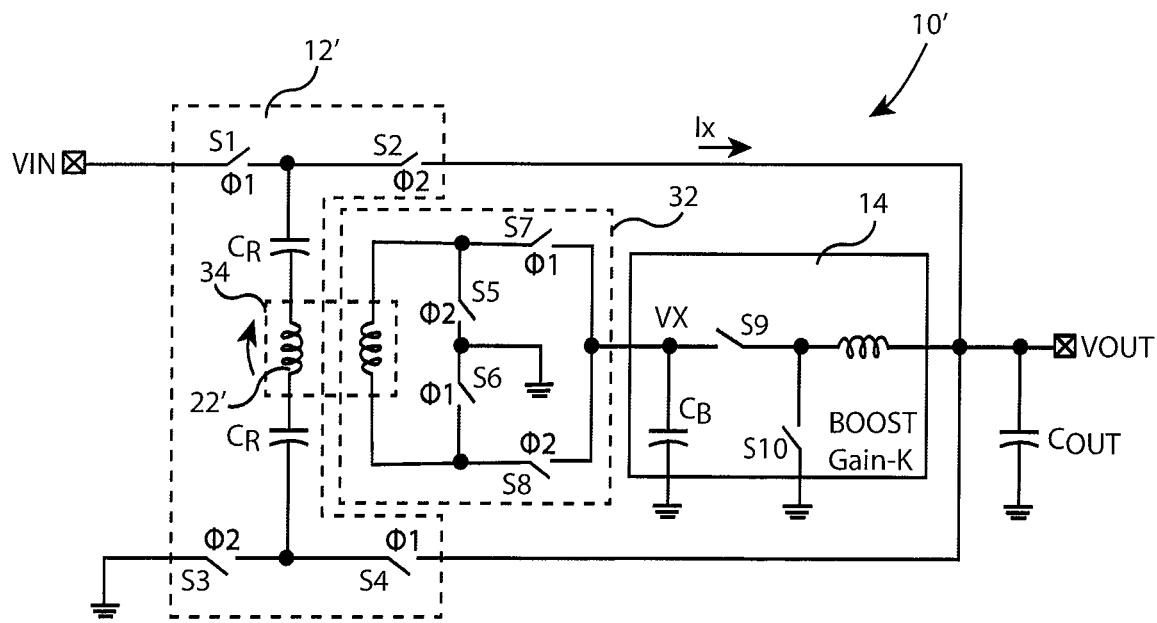
FIG. 3 is a schematic block diagram of an example transformer-coupled resonant converter.

FIG. 3 is a schematic block diagram of an example transformer-coupled resonant converter 10' including a resonant cell 12', a hard switching cell 14, and a rectifier 32. The resonant cell 12' is coupled to the rectifier 32 by a transformer 34, such that the secondary winding ("inductor") 22' of the transformer serves a similar function as the inductor 22 of FIG. 1. The rectifier 32 causes the current to always flow to the right, such that the current output of the hard switching cell 14 is negative, as in the previous example embodiment.

With continuing reference to FIG. 3, voltage VS is +n*VX during phase f1 and −n*VX during phase f2 such that:

If $Vx = Vout/D$ then $VIN - n*VOUT/D - VOUT = VOUT + n*VOUT/D$ and thus $$VOUT = VIN/[2*(1+n/D)] \quad (5)$$

By comparing equations (3) and (5) we arrive at the following:

$k+1 = 2 + 2*n/D,$ $$D = 2*n/(k-1) \quad (6)$$

Assuming Ix is the average current flowing through the secondary windings of the transformer during each phase of operation, the average output current (IOUT) and individual contributions of the ZCSC (IOUTR) and HSWC (IOUTB) can be calculated as follows:

$IOUTR = 2*Ix$ $IOUTB = 2*Ix*n/D$ $$IOUT = IOUTR + IOUTB = 2*Ix*(1+n/D) \quad (7)$$

For example, if k+1=30 and n=5 we get D=10/28=1/2.8. Starting from VIN=48V then VOUT=1.6V and VX=1.6V*2.8=4.48V. The ratio IOUTR/IOUT is 1/15 or 6.7%. Although the HSWC still provides most of the output current, it operates at a much lower VX voltage (the duty cycle is about ten times higher than in the transformerless case) so efficiency is greatly improved respect to the previous topology.

Figure 4:
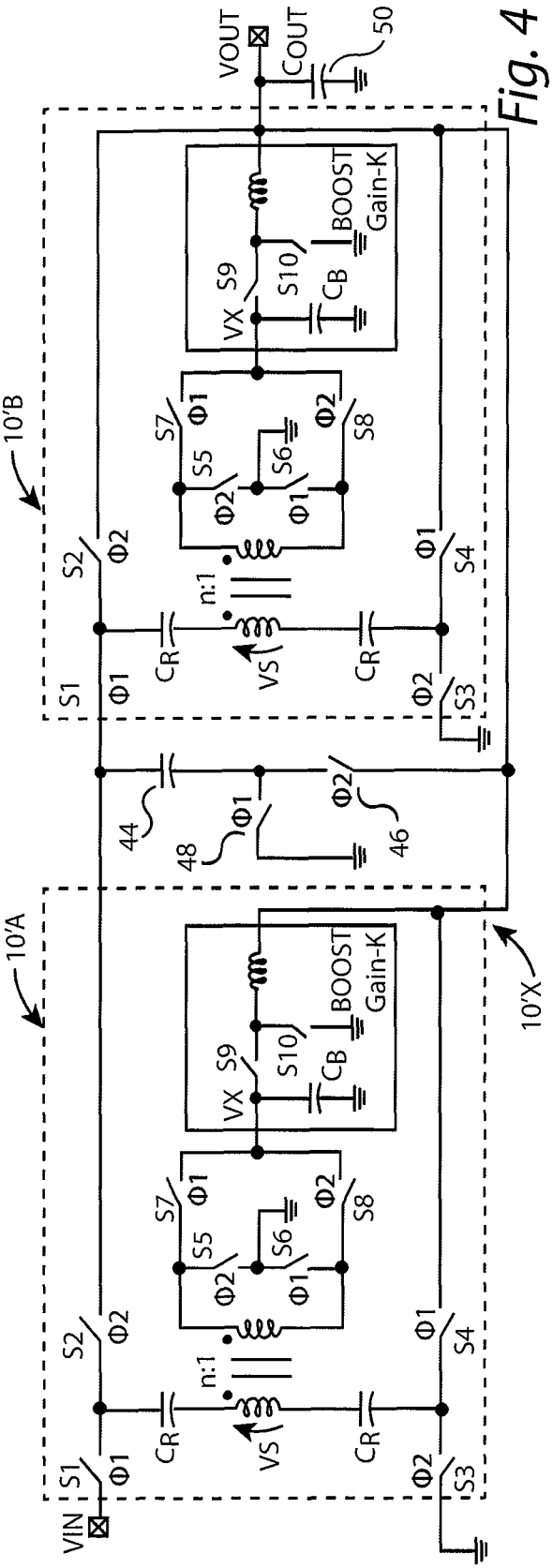
FIG. 4 is a schematic block diagram of an example two-stage transformer-coupled resonant converter.

FIG. 4 is a schematic block diagram of an example two-stage transformer-coupled resonant converter 10'X including two stages 10'A and 10'B. Coupled between the two stages are capacitor 44 and switches 46 and 48, and a smoothing capacitor 50 is coupled to the output VOUT. An advantage of cascading the stages is that the transformer ratio can be reduced for even greater efficiency. In this example embodiment, the portion of output current provided by the resonant cell of the converter that would otherwise be limited by the transformer design. Writing down equations for the two stages converter we get:

$VIN - (n/D)*VOUT - VOUT = VB + (n/D)*VOUT + VOUT;$ $VB - (n/D)*VOUT - VOUT = VOUT + (n/D)*VOUT;$
and thus $VB = 2*VOUT*(1+n/D);$ $$VIN = VOUT*(2+2*n/D+2+2*n/D) = 4*VOUT*(1+n/D) \quad (8)$$

Combining equations (3) and (7) we get now k+1=4+4*n/D. Solving for transformer ratio n, n=(k−3)*D/4.

In this case, assuming Ix is the average current flowing through the secondary windings of each transformer during each phase of operation, the average output current (IOUT) and individual contributions of the ZCSC (IOUTR) and HSWC (IOUTB) can be calculated as follows:

$IOUTR = 4*Ix$ $IOUTB = 4*Ix*n/D$ $$IOUT = IOUTR + IOUTB = 4*Ix*(1+n/D) \quad (9)$$

For a given transformer current capability Ix, the total output current is doubled respect to the converter of FIG. 3. Moreover, the contribution of the resonant cells to the total output power is also increased because the transformer turn ratio "n" can be made smaller. With the same numbers as the example above, if k=29, D=1/2.17 then n=3. The ratio IOUTR/IOUT is now 1/7.5 or 13.3% which is doubled respect to the converter of FIG. 3, in these non-limiting examples.

Reducing the transformer ratio leads to an increased amount of resonant cell output current respect to the single cell topology. Both efficiency and load step response benefit of this new arrangement since the resonant cell has higher efficiency and does not suffer from low input voltage limitation in load step response. To this extent, it should be noted that since the hard switching cell works at low VX, it can be operated at high frequency with no significant efficiency penalty. More than two cells can be cascaded to further improve output current capability (for a given transformer current capability) and overall efficiency.

The efficiency of the converter designs can be calculated, by way of non-limiting examples, as follows. The total average output power POUT is the sum of the individual average resonant cell (ZCSC) output power contributions (POUTR) and the hard switching cell (HSWC) output power contributions (POUTB). Similarly, the total average input power PIN is the sum of average input power contributions of the ZCSC (PINR) and HSWC (PINB).

$POUT = POUTR + POUTB$ $$PIN = PINR + PINB \quad (10)$$

Let's assume that αR and αB are the ZCSC and HSWC portions of the output power (αR+αB=1):

$POUTR = \alpha R * POUT$ $$POUTB = \alpha B * POUT \quad (11)$$

Since the two converters share the same output voltage, αR and αB can be easily calculated from output current contributions of each converter, as we will see in the following. Let's also assume that ηR and ηB are the ZCSC and HSWC power efficiency, respectively:

POUTR=ηR*PINR

POUTB=ηB*PINB            (12)

Based on the above assumptions and substituting equation (10). the total power efficiency ηT can be calculated as follows:

ηT=POUT/PIN=(POUTR+POUTB)/(PINR+PINB)

Replacing PINR and PINB from equation (12):

ηT=(POUTR+POUTB)/(POUTR/ηR+POUTB/ηB)

Finally, substituting POUTR and POUTB from equation (11) and recalling that αR+αB=1:

ηT=1/(αR/ηR+αB/ηB)            (13)

Let's consider the combined ZCSC-HSWC of FIG. 1. The total power efficiency can be obtained by applying 4) to determine αR and αB:

ηT=1/[D/(1+D)/ηR+1/(1+D)/ηB]            (14)

where D is the HSWC duty cycle.

As anticipated in earlier discussion, most of the output power is provided by the HSWC because D is very small. Therefore, the total power efficiency is close to the power efficiency that the HSWC would have if operating alone. Assuming VIN=48V, VOUT=1.6V we get D=VOUT/(VIN-VOUT)=0.0345 from which it emerges that only ~3% of the output power comes from the ZCSC and ~97% from the HSWC. Moreover, the large voltage conversion ratio of the HSWC makes its efficiency quite low thus limiting the efficiency of the combined topology significantly. As an example, assuming ηR=99% and ηB=90% we get ηT=90.3%.

Let's now consider the combined ZCSC-HSWC of FIG. 3. The total power efficiency can be obtained by applying equation (7) to determine αR and αB:

ηT=1/[1/(1+n/D)/ηR+n/D/(1+n/D)/ηB]            (15)

where D is the HSWC duty cycle. Assuming VIN=48V, VOUT=1.6V, n=5, D=1/2.8 and also ηR=99% (as in the previous case) and ηB=92.5% (because the HSWC operates at much lower input voltage) we get ηT=92.9%.

Finally, for the combined ZCSC-HSWC of FIG. 4 the total power efficiency obtained by applying equation (9) to determine αR and αB has the same form as previous case:

ηT=1/[1/(1+n/D)/ηR+n/D/(1+n/D)/ηB]            (16)

where D is the HSWC duty cycle. Assuming VIN=48V, VOUT=1.6V, n=3, D=1/2.17 and also ηR=99% (as in the previous case) and ηB=95% (since the HSWC operates at lower current than previous case) we get ηT=95.5%.

Figure 5:
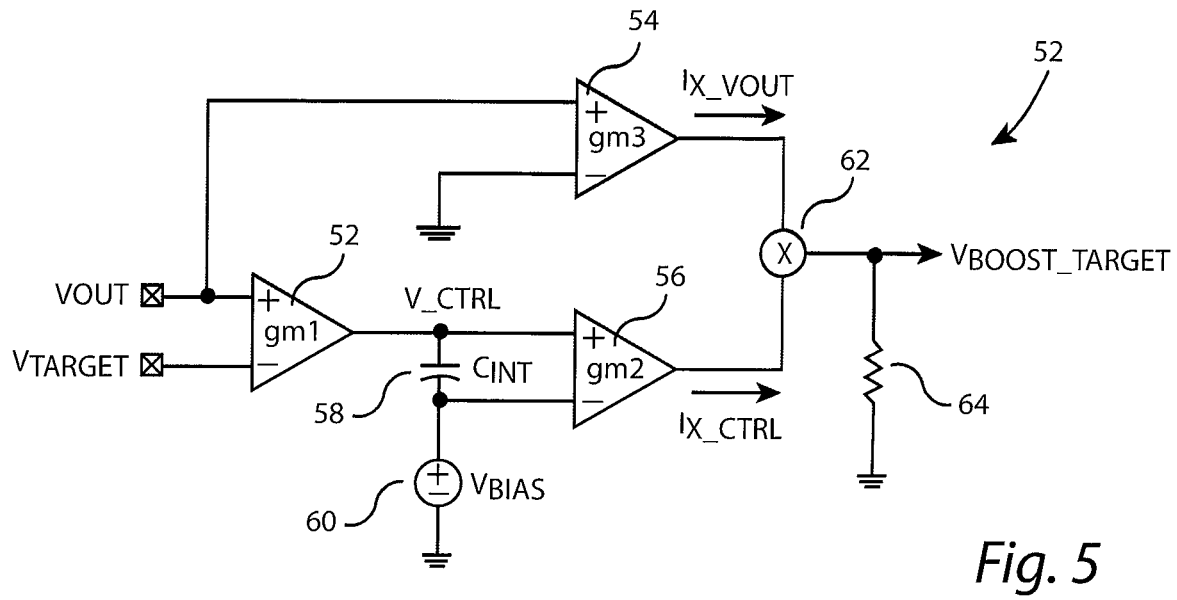
FIG. 5 is a schematic diagram of an example control circuit for a hard switching cell.

FIG. 5 is a schematic diagram of an example control circuit 52 for a hard switching cell 14 including a first operational amplifier (op amp) 52, a second op amp 54, a third op amp 56, a capacitor 58, a bias voltage source 60, a mixer 62 and an output resistor 64. The control circuit 52 provides voltage regulation for the hard switching cell, such that the gain of the booster is a function of the difference between the output voltage VOUT and a reference voltage VTARGET. More particularly, since the HSWC cell is formally a step-up converter (Boost) although from current flow point of view it acts as a step-down one (Buck). This poses the problem of controlling the overall converter output VOUT by acting on the step-up output VX. This can be accomplished by means of the circuit shown in FIG. 5. Currents $I_{X\_VOUT}$ and I_CTRL are generated from VOUT and integrator output V_CTRL respectively. The two currents are fed into an analog multiplier to get the Step-up target voltage $V_{BOOST\_TARGET}$. By doing so the conversion ratio k of the Step-up converter is continuously modulated to let overall converter VOUT track the desired target.

Figure 6:
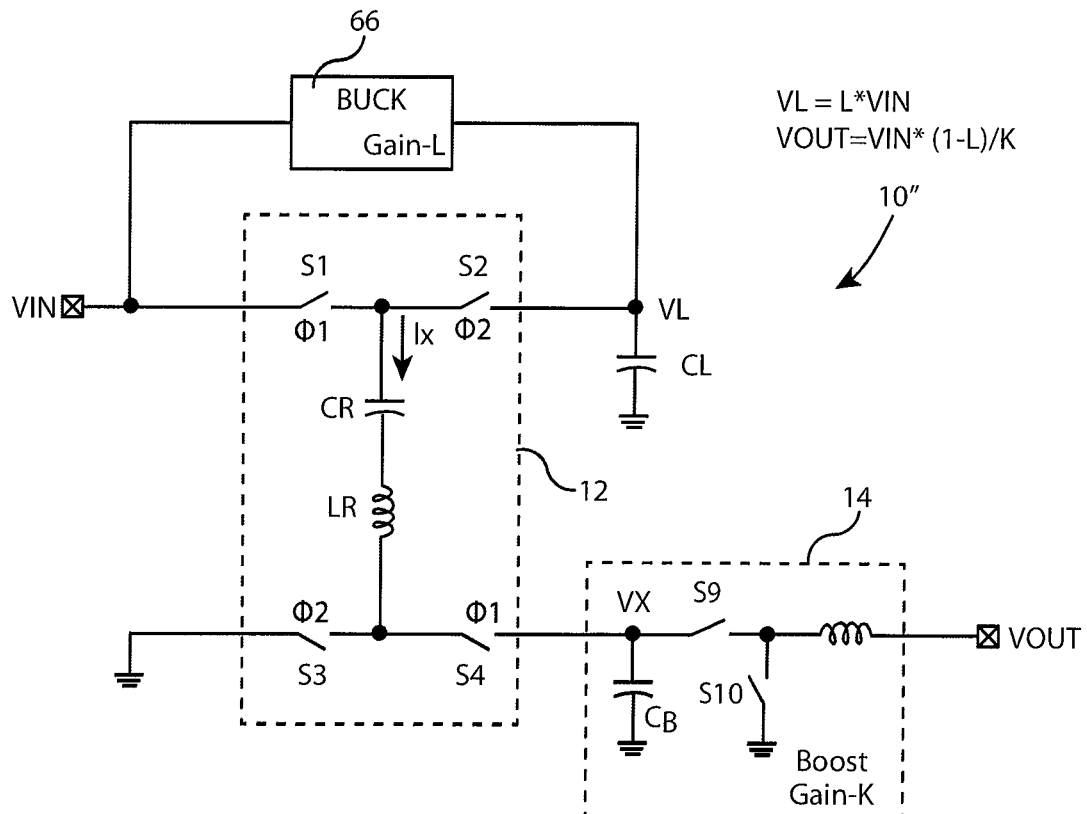
FIG. 6 is a schematic block diagram of an example two-level voltage output transformerless resonant converter.

FIG. 6 is a schematic block diagram of an example two-level voltage output transformerless resonant converter 10″ including a resonant cell 12, a hard switching cell 14, and a Buck converter 66 coupled between an input node VIN and an output node VL of the resonant cell 12. An advantage of the Buck converter 66 is that is allows for a recovery of some of the energy lost in the hard switching cell (Boost) 14, and that it provides for a voltage level VL in addition to the output voltage VOUT provided by the hard switching cell 14. The VL output can be used, for example, to power memory, while the VOUT output could be used, for example, to power a CPU.

Figure 7:
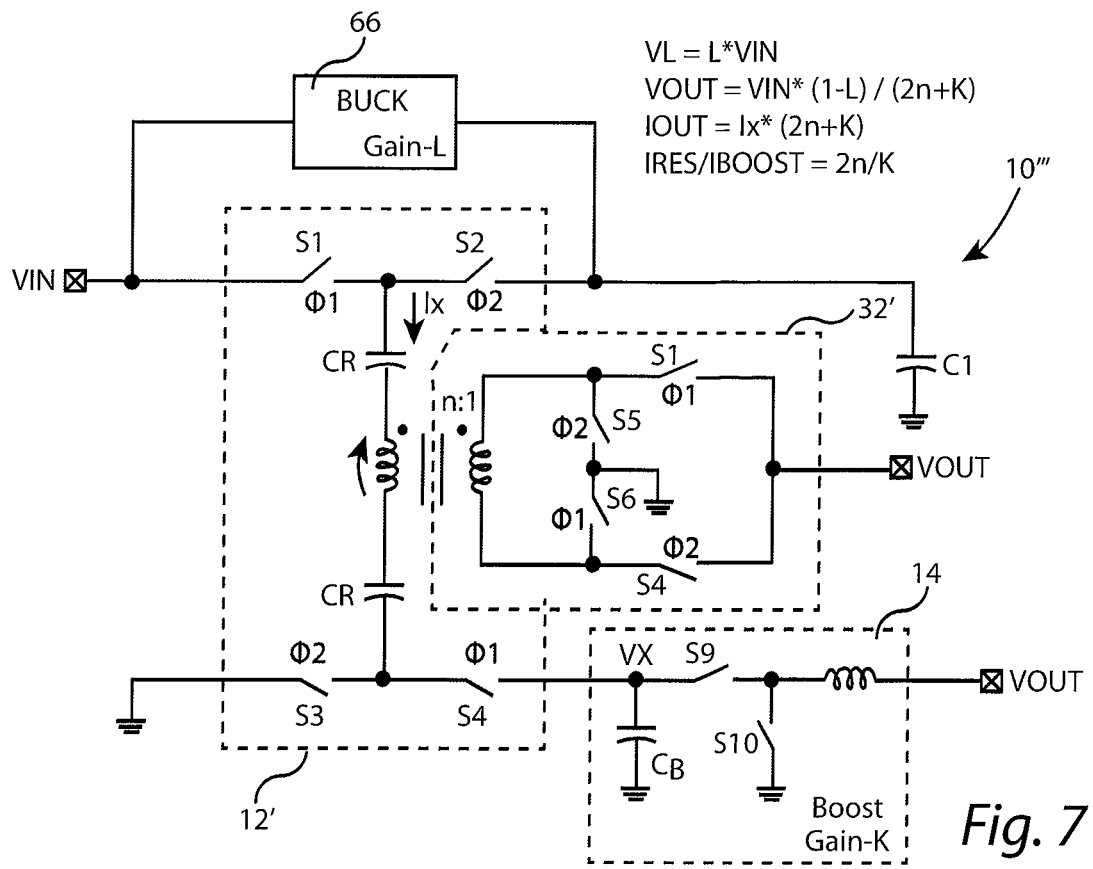
FIG. 7 is a schematic block diagram of an example two-level voltage output transformer-coupled resonant converter.

FIG. 7 is a schematic block diagram of an example two-level voltage output transformer-coupled resonant converter 10′″ including a resonant cell 12′, a hard switching cell 14, a Buck converter 66, and a rectifier 32′. This example embodiment, like the example embodiment of FIG. 6, has the advantage of recovering energy that would otherwise be lost in the hard switching cell, and provides an additional voltage level VL which can be used to power, for example, computer memory.

Figure 8:
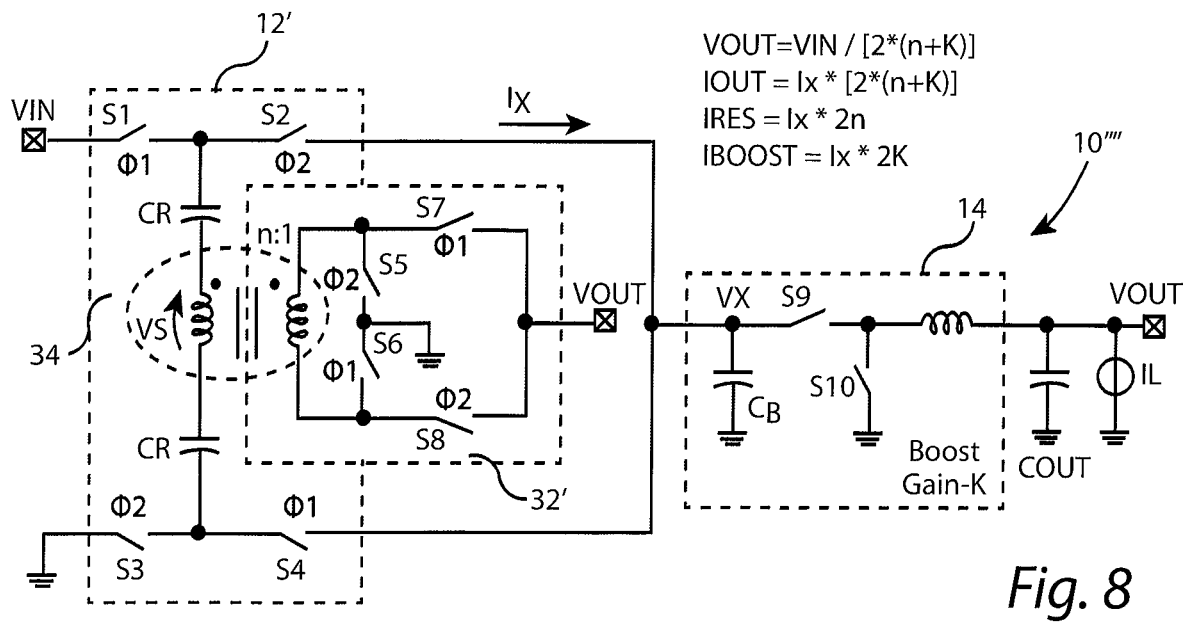
FIG. 8 is a schematic block diagram of an example transformer-coupled resonant converter with enhanced resonant current output.

FIG. 8 is a schematic block diagram of an example transformer-coupled resonant converter with enhanced resonant current output 10″″ including a resonant cell 12′, a hard switching cell 14, and a rectifier 32′. In this example embodiment, the output of the transformer 34 is coupled directly to VOUT, which increases the contribution of the resonant cell 12′ to the output VOUT.

Figure 9:
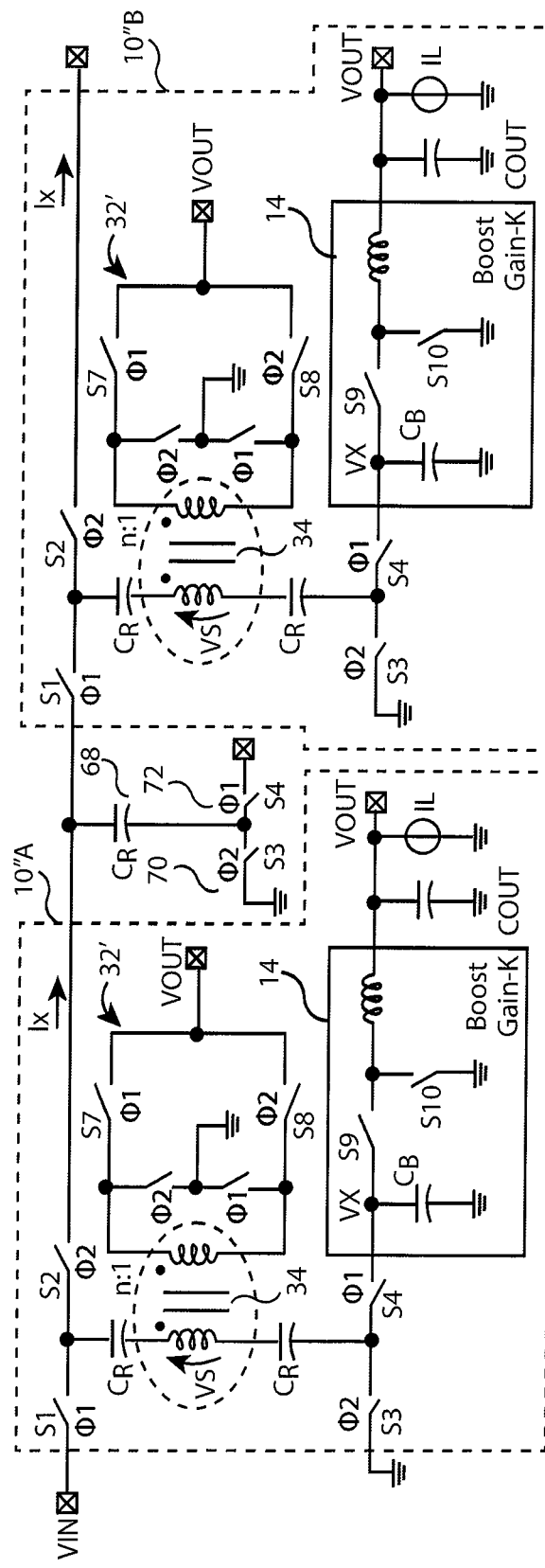
FIG. 9 is a schematic block diagram of an example two-stage transformer-coupled resonant converter with enhanced resonant current output.

FIG. 9 is a schematic block diagram of an example two-stage transformer-coupled resonant converter 10″X with enhanced resonant current output including a first resonant converter stage 10″A and a second resonant converter stage 10″B. The two stages have, coupled between them, a capacitor 68 and switches 70 and 72. In this example embodiment, the primary winding of the transformers 34 are coupled directly to the VOUT output, with similar advantages to those discussed with reference to FIG. 8.

Figure 10:
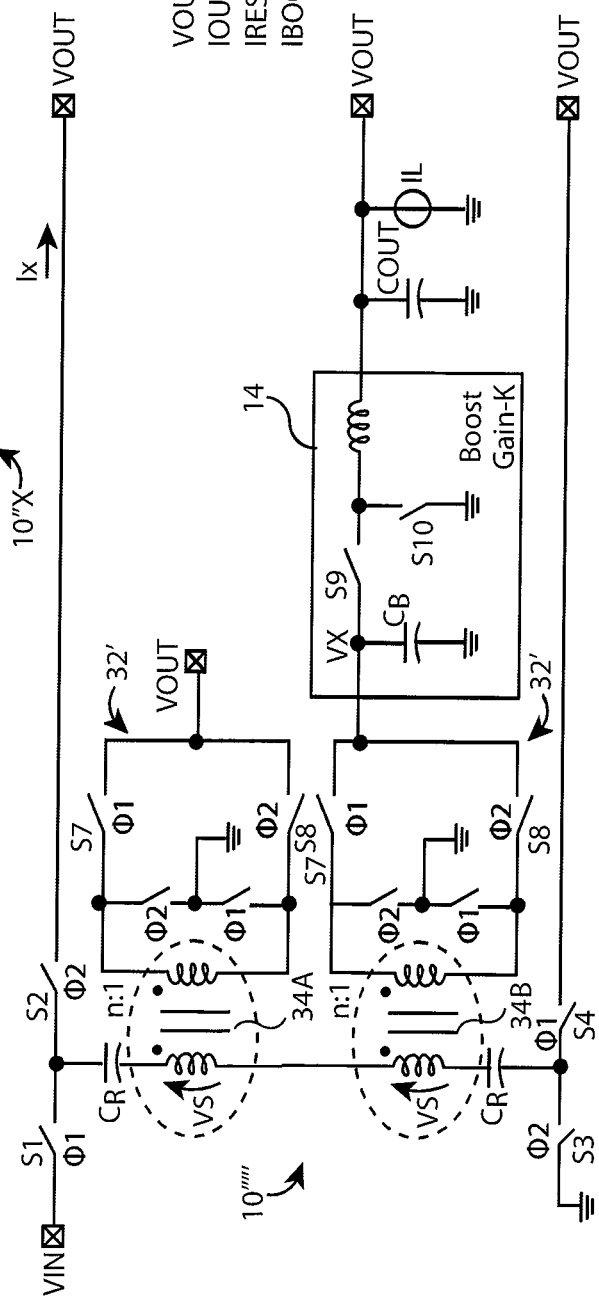
FIG. 10 is a schematic block diagram of an example transformer-coupled resonant converter with two transformers.

FIG. 10 is a schematic block diagram of an example transformer-coupled resonant converter 10″″ with two stacked transformers 34A and 34B. Transformer 34A, in this non-limiting example, is coupled directly to VOUT, while transformer 34B is coupled to VX of the hard switching cell 14. This hybrid design has advantages of prior embodiments including enhanced operational efficiency.

Figure 11:
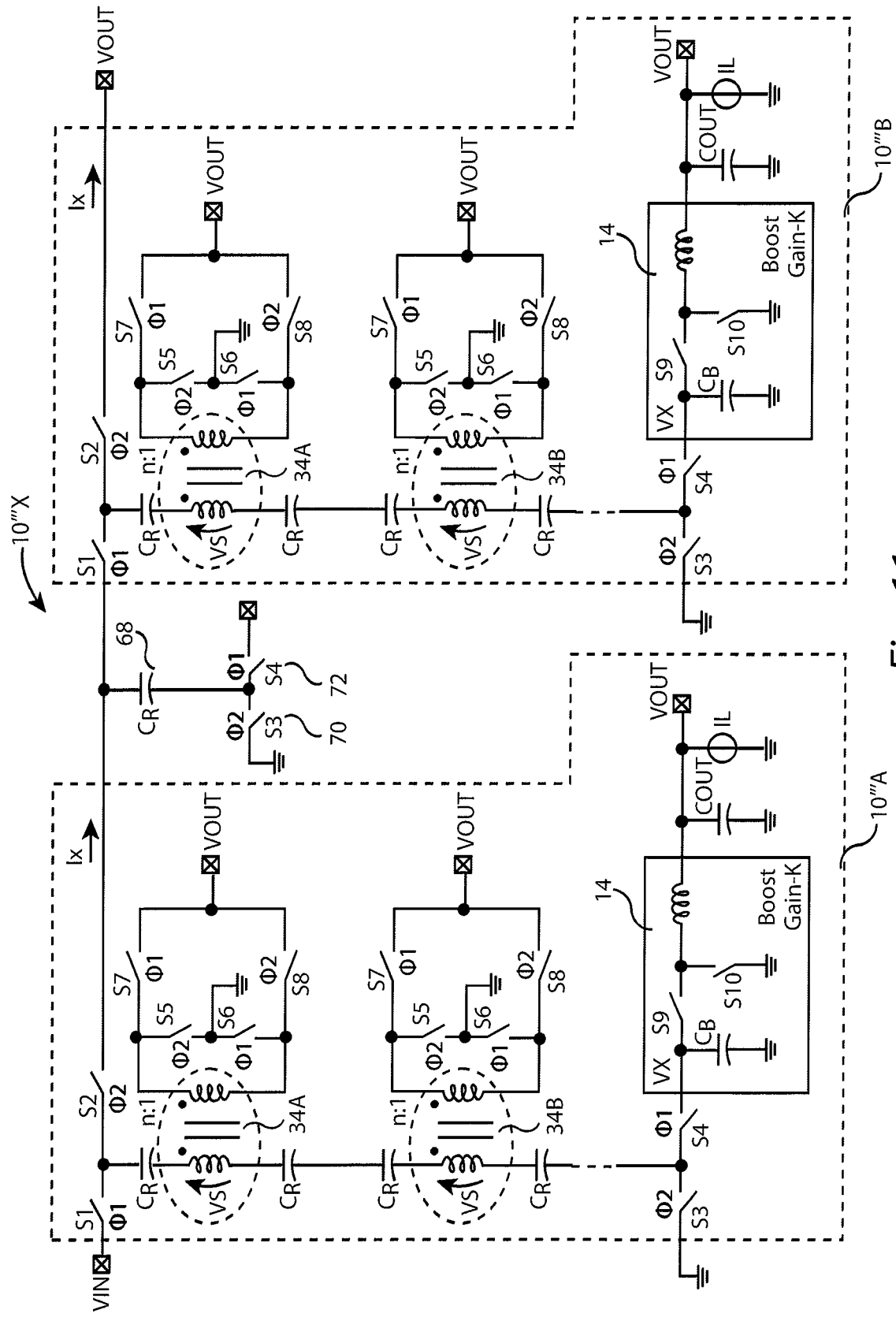
FIG. 11 is a schematic block diagram of an example two-stage transformer-coupled resonant converter with two transformers per stage.

FIG. 11 is a schematic block diagram of an example two-stage transformer-coupled resonant converter 10′″ with two stacked transformers 34A and 34B on the resonant line of each stage. Coupled between the two stages are a capacitor 68 and switches 70 and 72. In this example embodiment, the transformers 34A and 34B are both directly coupled to the output VOUT for reasons explained previously above.

Although various embodiments have been described using specific terms and devices, such description is for illustrative purposes only. The words used are words of description rather than of limitation. It is to be understood that changes and variations may be made by those of ordinary skill in the art without departing from the spirit or the scope of various inventions supported by the written disclosure and the drawings. In addition, it should be understood that aspects of various other embodiments may be interchanged either in whole or in part. It is therefore intended that the claims be interpreted in accordance with the true spirit and scope of the invention without limitation or estoppel.

What is claimed is:

1. A programmable, high efficiency resonant converter comprising:
   a voltage output VOUT;
   a resonant cell having a feedback input; and
   a hard switching cell having a feedback input coupled to the voltage output VOUT and a voltage output VX coupled to the feedback input of the resonant cell;
   wherein the resonant cell includes a series connection of a capacitor and an inductor, wherein the voltage output VOUT is coupled to the capacitor by a first switch and the feedback input is coupled to the first inductor by a second switch.

2. A programmable, high efficiency resonant converter as recited in claim 1 wherein the hard switching cell is configured as a Boost converter having a gain K.

3. A programmable, high efficiency resonant converter as recited in claim 1, further comprising a control circuit coupled to the hard switching cell to control a gain of the hard switching cell.

4. A programmable, high efficiency resonant converter as recited in claim 1, further comprising a control circuit control that provides voltage regulation for the hard switching cell.

5. A programmable, high efficiency resonant converter as recited in claim 1, further comprising a control circuit including at least one operational amplifier (op amp) to continuously modulate a conversion ratio of the hard switching cell.

6. A programmable, high efficiency resonant converter as recited in claim 1 wherein the resonant cell has an input node VIN and an output node VL, and further comprising a Buck converter coupled between the input node VIN and the output node VL.

7. A programmable, high efficiency resonant converter as recited in claim 4 wherein the hard switching cell is configured as a Boost converter having a gain K.

8. A programmable, high efficiency resonant converter as recited in claim 2 wherein the Boost converter includes an inductor coupled to a capacitor and to the voltage output VX with a switch and wherein the voltage output VOUT is coupled to the inductor, whereby a negative current is applied to the resonant cell.

9. A programmable, high efficiency resonant converter comprising:
   a voltage output VOUT;
   a resonant cell having a feedback input including a first winding of a transformer;
   a hard switching cell having a feedback input coupled to the voltage output VOUT and a voltage output VX coupled to the feedback input of the resonant cell; and
   a rectifier including a second winding of the transformer coupling the voltage output VX to the feedback input of the resonant cell;
   wherein the resonant cell includes the series connection of a first capacitor, the first winding of the transformer, and a second capacitor, wherein the first capacitor is coupled to the voltage output VOUT and the second capacitor is coupled to ground.

10. A programmable, high efficiency resonant converter as recited in claim 9 wherein the Boost converter includes an inductor coupled to a capacitor and to the voltage output VX with a switch and wherein the voltage output VOUT is coupled to the inductor, whereby a negative current is applied to the resonant cell.

11. A programmable, high efficiency resonant converter as recited in claim 9 further comprising a control circuit coupled to the hard switching cell to control a gain of the hard switching cell.

12. A programmable, high efficiency resonant converter as recited in claim 9 further comprising a control circuit control that provides voltage regulation for the hard switching cell.

13. A programmable, high efficiency resonant converter as recited in claim 9 further comprising a control circuit including at least one operational amplifier (op amp) to continuously modulate a conversion ratio of the hard switching cell.

14. A programmable, high efficiency resonant converter as recited in claim 9 wherein the resonant cell has an input node VIN and an output node VL, and further comprising a Buck converter coupled between the input node VIN and the output node VL.

15. A multistage resonant converter system comprising:
   a voltage output VOUT;
   a plurality of stages, each of which include
      (a) a resonant cell having a feedback input;
      (b) a hard switching cell having a feedback input coupled to the voltage output VOUT and a voltage output VX coupled to the feedback input of the resonant cell; and
      (c) a series connection of a capacitor and a switch coupling a line connecting adjacent stages to one of VOUT and ground;
   wherein the resonant cell includes a series connection of a capacitor and an inductor, wherein the voltage output VOUT is coupled to the capacitor by a first switch and the feedback input is coupled to the first inductor by a second switch.

16. A multistage resonant converter system as recited in claim 15 wherein the hard switching cell is configured as a Boost converter having a gain K.

17. A multistage resonant converter system as recited in claim 16 wherein the Boost converter includes an inductor coupled to a capacitor and to the voltage output VX with a switch and wherein the voltage output VOUT is coupled to the inductor, whereby a negative current is applied to the resonant cell.

18. A multistage resonant converter system comprising:
   a voltage output VOUT;
   a plurality of stages, each of which include
      (a) a resonant cell having a feedback input;
      (b) a hard switching cell having a feedback input coupled to the voltage output VOUT and a voltage output VX coupled to the feedback input of the resonant cell; and
      (c) a series connection of a capacitor and a switch coupling a line connecting adjacent stages to one of VOUT and ground;
   wherein the feedback input of the resonant cell includes a first winding of a transformer, and further comprising a rectifier includes a second winding of the transformer, wherein the rectifier couples the voltage output VX to the feedback input of the resonant cell; and
   wherein the resonant cell includes the series connection of a first capacitor, the first winding of the transformer, and a second capacitor, wherein the first capacitor is coupled to the voltage output VOUT and the second capacitor is coupled to ground.

19. A method for providing a programmable, high efficiency resonant converter comprising:
    resonating a current on a resonating line of a resonant cell including a series connection of a capacitor and an inductor;
    providing a negative feedback current with a Boost converter coupled to an output voltage VOUT; and
    coupling the output voltage VOUT to the capacitor by a first switch and coupling the negative feedback current to the inductor by a second switch.

20. A method for providing a programmable, high efficiency resonant converter as recited in claim 19 further comprising controlling a gain of the Boost converter.

* * * * *